(12) United States Patent
Rosendahl et al.

(10) Patent No.: US 7,217,357 B2
(45) Date of Patent: May 15, 2007

(54) OIL FILTER FOR ENGINES, TRANSMISSIONS OR AUTOMATIC TRANSMISSIONS

(75) Inventors: Marco Rosendahl, Wiehl (DE); Markus Beer, Morsbach (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 244 days.

(21) Appl. No.: 10/182,149

(22) PCT Filed: Dec. 6, 2000

(86) PCT No.: PCT/EP00/12248

§ 371 (c)(1),
(2), (4) Date: Dec. 4, 2002

(87) PCT Pub. No.: WO01/55563

PCT Pub. Date: Aug. 2, 2001

(65) Prior Publication Data

US 2003/0132147 A1    Jul. 17, 2003

(30) Foreign Application Priority Data

Jan. 28, 2000   (DE) .............................. 100 03 710

(51) Int. Cl.
*B01D 27/10*   (2006.01)

(52) U.S. Cl. ..................... 210/130; 210/130; 210/149; 210/171; 236/93 R; 236/101 D

(58) Field of Classification Search ................ 210/130, 210/133, 136, 167, 168, 459, 460, 461, 149; 123/196 A, 196 S, 171, 149; 137/468, 535–543.13; 236/93 R, 101 D
See application file for complete search history.

(56) References Cited

U.S. PATENT DOCUMENTS

| | | | | |
|---|---|---|---|---|
| 2,158,512 A | * | 5/1939 | Layte et al. ................ | 210/458 |
| 3,056,501 A | * | 10/1962 | Thorman et al. ........... | 210/132 |
| 3,773,144 A | | 11/1973 | Hummel .................... | 184/6.24 |
| 4,181,611 A | | 1/1980 | Rubenstein et al. ........ | 210/149 |
| 4,783,271 A | * | 11/1988 | Silverwater ................ | 210/149 |
| 4,915,852 A | | 4/1990 | Tomlinson ................. | 210/805 |
| 5,934,241 A | | 8/1999 | Von Esebeck et al. .. | 123/196 R |
| 5,984,195 A | * | 11/1999 | Benedict .................... | 236/12.2 |
| 6,039,030 A | * | 3/2000 | Robinson et al. .......... | 123/457 |
| 6,294,083 B1 | * | 9/2001 | Lee et al. ................... | 210/130 |

FOREIGN PATENT DOCUMENTS

DE   197 35 444 A   1/1999

OTHER PUBLICATIONS

International Search Report for International Application No. PCT/EP00/12248, dated Mar. 27, 2001, published on Jul. 19, 2001 under No. WO 01/55563.

* cited by examiner

*Primary Examiner*—Terry K. Cecil
(74) *Attorney, Agent, or Firm*—Baker & Hostetler LLP

(57) ABSTRACT

Oil filter for engines, transmissions or automatic transmissions, said oil filter being integrated in an oil pan, at least one bypass valve being arranged on the oil filter, the bypass valve containing a spring whose spring resistance increases with increasing temperature, said spring opening and closing an opening of the bypass valve with the aid of a closing lid.

17 Claims, 2 Drawing Sheets

OIL FILTER FOR ENGINES, TRANSMISSIONS OR AUTOMATIC TRANSMISSIONS

The present invention relates to an oil filter for engines, transmissions or automatic transmissions, said oil filter being integrated in an oil pan and at least one bypass valve being arranged on the oil filter.

Different types of oil filters for engines and transmissions or automatic transmissions are familiar from the prior art. The known filters generally consist of a flat filter housing comprising two half shells. Between these two half shells, a filter medium is mounted which takes the form of a plate, pocket or bellows, for instance a metal sieve, a paper filter or a polyester felt filter. The filter half shells, joined airtight, can be made of metals or plastic or of a combination of a plastic shell or metal shell.

The filters are installed in a wide variety of free spaces in the transmission or engine compartment. For example, the German patents 197 35 444.0 and 197 35 445.9 and the applicant's German patent application 199 55 636.9 (not previously published) describe an oil pan and an oil filter insert for oil pans for engines and transmissions, where the oil filter is arranged within the oil pan.

The problem with suction oil filters, on which a flat, plate-like or pocket-shaped filter medium is employed, is the poor flow properties of the oil at low temperatures or that the pressure loss via the filter is too high. This gives rise to excessive suction pressures for the pump, causing pump cavitation and switching or functional problems in the transmission or engine. To solve this problem, the prior art provides for a bypass valve to reduce the suction pressure in the oil filter. Conventional bypass valves always have the same opening pressure at all temperatures, which in the higher temperature range can sometimes result in an undesired unfiltered oil flow.

The purpose of using bypass valves in pressure oil filters in engines and transmissions is also to ensure a minimum oil flow on the pressure side of the pump. In the prior art, all the designs of bypass valves focus on the cold oil temperature range or if the pressure loss via the filter is too high since the flow properties in the used filter systems automatically deteriorate dramatically because of the poor viscosity properties of the oils used. The problem of conventional valves is one of designing the opening range or opening pressure for the bypass valve in the low-temperature range without the bypass valve opening under normal load in the warm range. Another disadvantage is that a bypass valve in its open state sometimes closes poorly and inaccurately owing to the prevailing main circulation, even if the higher temperature range has already been reached. This results in an undesired unfiltered oil flow in the oil's warm and hot range.

European patent 0 023 491 describes a temperature and differential pressure valve for a liquid filter with a temperature-dependent adjusting means that opens and closes the bypass valve in relation to temperature. The temperature-dependent adjusting means is one made of a material that expands with increasing temperature.

The disadvantage of this prior art design is the large number of parts required and its associated complex and costly design and susceptibility to malfunction.

The technical object of the present invention is therefore to provide an oil filter which avoids the disadvantages of the prior art. In particular, it should ensure a minimum oil flow at low temperatures when the oil has a high viscosity while severely restricting an unfiltered oil flow at higher temperatures. The design should also be less complex and thus less expensive and less susceptible to malfunction.

This technical object is achieved by an oil filter for engines, transmissions or automatic transmissions, said oil filter being integrated in an oil pan, at least one bypass valve 9 being arranged on the oil filter, the bypass valve 9 containing a spring 11 whose spring resistance increases with increasing temperature, said spring 11 opening and closing an opening 15 of the bypass valve 9 with the aid of the closing means 12.

The advantage of the inventive oil filter is that the bypass valve compensates for the poor flow properties of the oil at low temperatures and for the resultant high pressures in the filter element. Pump cavitation and switching or functional problems are minimized as a consequence. The spring of the bypass valve is made of a material that causes the spring to modify its spring resistance in relation to temperature. The spring therefore has a lower spring resistance at low temperatures than at warm oil temperatures. This means that in the cold range the spring is soft and in the warm range hard. The spring resistance and the temperature range can be optimally adjusted depending on the functional requirements and adapted to the required conditions in the hydraulic circuit. In the cold oil range, the opening of the bypass valve can therefore be clearly and much more precisely defined. Furthermore, the opening of the bypass valve in the warm range is significantly impeded. The inventive device makes it possible to generate two highly different bypass opening pressures and thus two different functions with a single bypass valve design. A particularly advantageous feature of the inventive oil filter is its simple, less expensive design which is less susceptible to malfunction and hence maintenance-free.

In a preferred embodiment, the oil filter comprises an oil filter housing 1 with an oil filter top shell 2 and an oil filter bottom shell 3, an oil filter medium 4 being arranged between the oil filter top shell 2 and the oil filter bottom shell 3, and a top flow chamber 5 being arranged above the oil filter medium 4 and a bottom flow chamber 6 below the oil filter medium 4, the oil filter bottom shell 3 having an opening 7 and the oil filter top shell 2 an opening 8, the opening 15 of the bypass valve 9 representing the connection of the top flow chamber 5 to the outside. In another particularly preferred embodiment the spring 11 of the bypass valve 9 is arranged within a bypass valve housing 10 between a bypass valve housing lid 13 and a closing means 12. This simple design of the bypass valve ensures long-term and maintenance-free function.

In a preferred embodiment the spring resistance of the spring 11 increases with increasing temperature, thus closing the opening 15 of the bypass valve 9 with the closing means 12. The spring resistance of the spring 11 decreases with decreasing temperature, thus opening more easily the opening 15 of the bypass valve with the closing means 12.

The closing means 12 is preferably a closing lid. In a preferred embodiment the oil filter forms an insert for oil pans. In another preferred embodiment the oil filter bottom shell 3 is formed by parts of the oil pan.

In another particularly preferred embodiment the oil filter is a suction oil filter. In this case the opening 7 of the oil filter bottom shell 3 is an oil inlet and the opening 8 of the oil filter top shell 2 an oil outlet.

In an alternative embodiment the oil filter is a pressure oil filter. In this case the opening 7 of the oil filter bottom shell 3 is an oil outlet and the opening 8 of the oil filter top shell 2 is an oil inlet.

In another preferred embodiment the spring 11 is made of a shape memory alloy. Shape memory alloys are metal materials whose mechanical properties are modifiable over a broad range under the influence of temperature. The effect is such that after plastic deformation a component made of a shape memory alloy—a piece of wire, for example—is restored to its original shape merely by heating. Shape memory alloys occur in two different, temperature-dependent phases in which they have totally different characteristics. The shape memory effect is the result of a crystallographic, reversible, martensitic phase transition in the solid state. The phase at higher temperature is known as austenite, and that at lower temperature as martensite. The martensite is deformable due to boundary layers which are easily displaced against one another. When the deformed martensite is heated beyond the transition temperature, the deformed martensite structure is restored to its original austenite lattice. The component regains its original shape.

In another particularly preferred embodiment the crystallographic, reversible, martensitic phase transition takes place with a change in temperature within the range of −30° C. to +30° C. The spring's spring resistance changes by up to 80% in this temperature range as the viscosity of the used oils only changes slightly at temperatures above 30° C.

In a particularly preferred fashion, the shape memory alloy of the spring 11 is selected from the group of NiTi, CuZnAl and CuAlNi.

The spring resistance of the spring 11 preferably changes within a range of 0.1 N to 120 N. In a preferred embodiment the spring resistance of the spring 11 in suction oil filters ranges from 10 to 30 N at temperatures above 30° C. In pressure oil filters the spring resistance ranges from 30 to 100 N at temperatures above 30° C.

The subject matter of the invention is explained in greater detail in the following figures.

Figure 1:
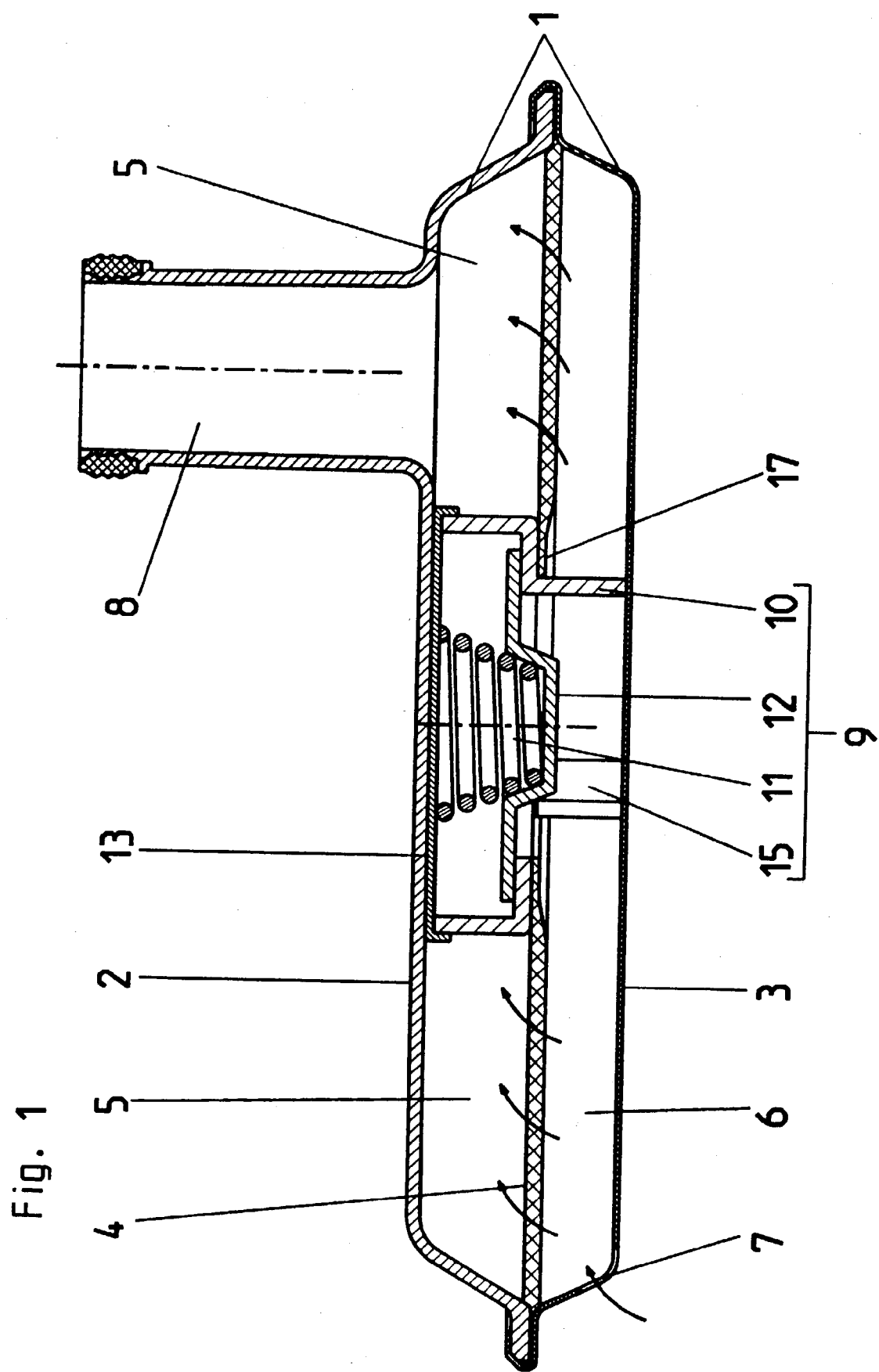
FIG. 1 shows a view of the inventive oil filter in cross section.

FIG. 1 shows a view of the inventive oil filter in cross section. The figure shows a suction oil filter which is outwardly delimited by the oil filter housing 1. An oil filter medium 4 is arranged within the oil filter housing. Above the filter medium 4 is a top flow chamber 5 and another flow chamber 6 is arranged below the oil filter medium 4. The bypass valve 9 consists in this embodiment of a bypass valve housing 10, a bypass valve housing lid 13, a spring 11 and a closing lid 12. In this case the spring 11 is arranged between the bypass valve housing lid 13 and the closing lid 12. The closing lid 12 is pressed by the spring 11 into the opening 15 of the bypass valve to close the opening. The springs are made of shape memory alloys. In normal operation the oil flows via the opening of the oil filter bottom shell 7 (oil inlet) into the bottom flow chamber 6. From there the oil flows through the filter medium 4 into the top flow chamber 5 and from there via the opening of the oil filter top shell 8 (oil filter outlet) to the pump. At low temperatures the spring resistance of the spring 11 is low and the viscosity of the oil high. At an appropriate suction oil pressure, the opening of the bypass valve is therefore open and the oil, bypassing the oil filter medium 4, flows via the opening 15 into the top flow chamber 5 directly and from there via the opening 8 of the oil filter top shell to the pump. At higher temperatures the spring resistance of the spring 11 is very much higher. The opening 15 of the bypass valve 9 therefore remains closed. At higher temperatures the viscosity of the oil is also lower, which means that 100% of the volumetric flow of oil passes through the oil filter medium 4 in order to reach the top flow chamber 5 of the oil filter.

Figure 2:
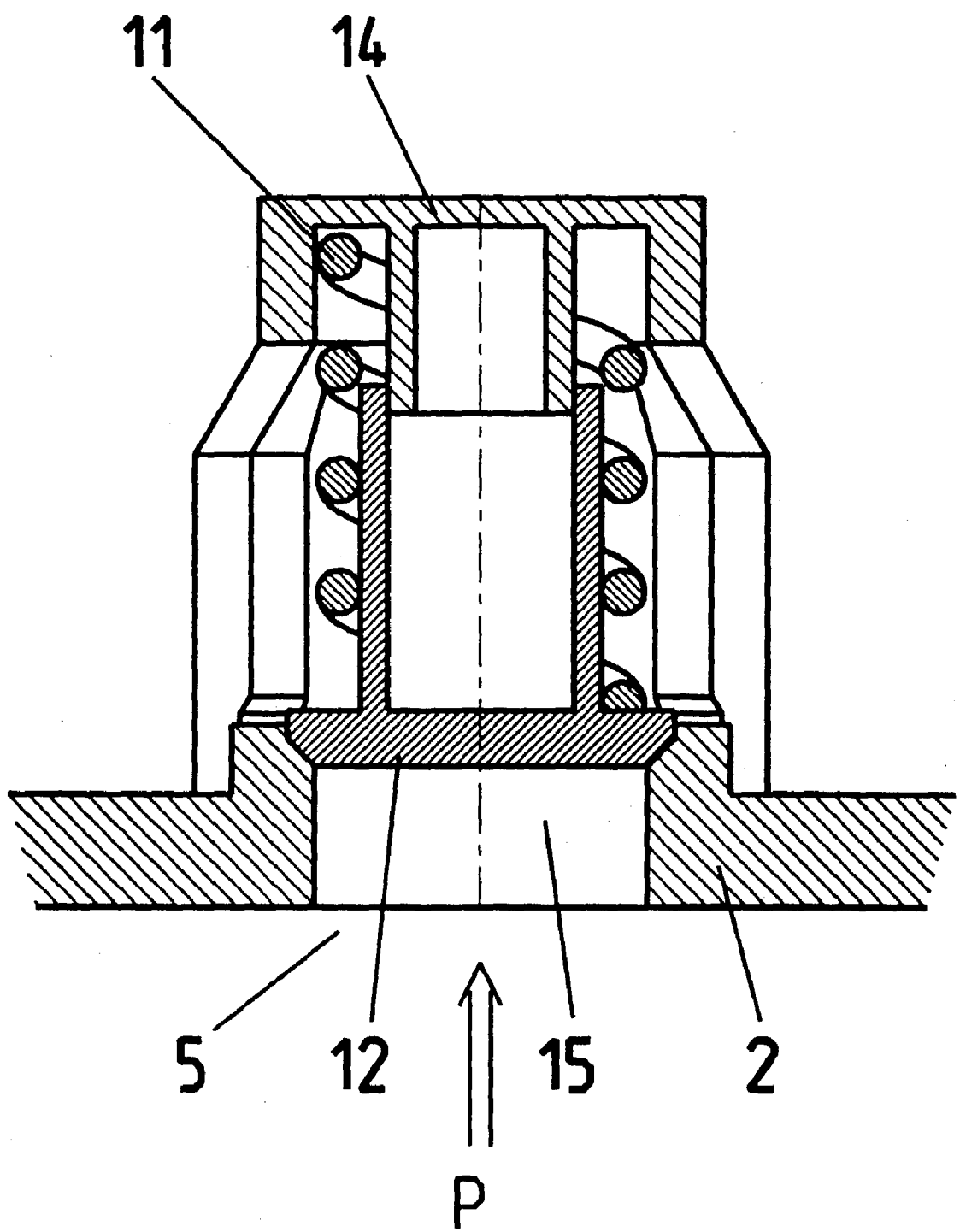
FIG. 2 shows a detailed view of the bypass valve 9 of the inventive pressure oil filter.

FIG. 2 shows a detailed view of the bypass valve 9 of the inventive pressure oil filter. In the pressure oil filter the bypass valve 9 is arranged in the oil filter top shell 2. The bypass valve 9 consists of a bypass valve housing with the seat 14, the closing means 12 (a closing lid) and the spring 11. The bypass valve housing 14 is connected via struts to the oil filter top shell 2. Under the control of the spring 11 the closing means 12 is displaceable via a guide against the seat of the bypass valve housing. The opening 15 of the bypass valve can be opened and closed. At low temperatures, when the oil is highly viscous and the spring has a low spring resistance, the valve opens and the oil, bypassing the oil filter medium (not shown), flows from the top flow chamber 5 through the opening of the bypass valve 15 outside.

The invention claimed is:

1. An oil filter for engines, transmissions or automatic transmissions, said oil filter being integrated in an oil pan and comprising:
   an oil filter housing having a top shell and a bottom shell and a filter medium positioned therein; and
   at least one bypass valve arranged within the oil filter housing and comprising (i) a bypass housing, (ii) a bypass opening, (iii) a closing means seated within the bypass valve housing, (iv) a spring biasing the closing means to block said bypass opening, and (v) a bypass housing lid,
   said bypass housing lid capping said bypass valve housing and consisting of a planar section positioned against an underside of the top shell and an outer peripheral flange surrounding the bypass valve housing,
   said spring having a spring resistance that increases with increasing temperature, wherein the spring resistance of the spring is a range of 10 N to 120 N when the spring is at temperatures above 30° C., and wherein said spring is made from a shape memory alloy, selected from the group consisting of NiTi, CuZnAl or CuAlNi,
   said closing means being configured to allow oil to bypass the filter medium when the unfiltered oil pressure overcomes the spring resistance.

2. The oil filter according to claim 1, wherein the oil filter comprises a top flow chamber above the filter medium and a bottom flow chamber below the filter medium, the bottom shell having an opening and the top shell having an opening, the opening of the bypass valve representing the connection of the top flow chamber to the outside.

3. The oil filter according to claim 2, wherein the spring of the bypass valve is arranged within the bypass valve housing between the bypass valve housing lid and the closing means.

4. The oil filter according to claim 2, wherein the oil filter bottom shell is formed by parts of the oil pan.

5. The oil filter according to claim 2, wherein the oil filter is a suction oil filter.

6. The oil filter according to claim 5, wherein an opening of the oil filter bottom shell is an oil inlet and an opening of the oil filter top shell is an oil outlet.

7. The oil filter according to claim 1, wherein the spring resistance of the spring increases with increasing temperature, thus closing the opening of the bypass valve with the aid of the closing means, and the spring resistance of the spring decreases with decreasing temperature, thus opening the opening of the bypass valve with the closing means.

8. The oil filter according to claim 1, wherein the closing means is a closing lid.

9. The oil filter according to claim 1, wherein the oil filter forms an insert for oil pans.

10. The oil filter according to claim 1, wherein the oil filter is a pressure oil filter.

11. The oil filter according to claim 10, wherein an opening of an oil filter bottom shell is an oil outlet and an opening of an oil filter top shell is an oil inlet.

12. The oil filter according to claim 1, wherein the shape memory alloy undergoes in its solid state a crystallographic, reversible, martensitic phase transition, the shape memory alloy changing with a change in temperature between the martensitic phase at lower temperatures to the austenitic phase at higher temperatures.

13. The oil filter according to claim 1, wherein the crystallographic, reversible, martensitic phase transition takes place with a change in temperature within the range of −30° C. to +30° C.

14. The oil filter according to claim 1, wherein the spring resistance of the spring in suction oil filters ranges from 10 N to 30 N at temperatures above 30° C., and in pressure oil filters the spring resistance ranges from 30 N to 100 N at temperatures above 30° C.

15. The oil filter according to claim 1, wherein the spring has a variable radius.

16. The oil filter according to claim 1, wherein the spring is coaxial with a bypass valve housing.

17. The oil filter according to claim 1, wherein the spring surrounds a closing means.

* * * * *